(12) United States Patent
Morton

(10) Patent No.: US 6,260,703 B1
(45) Date of Patent: Jul. 17, 2001

(54) FOLDED GREETING CARD HOLDING AN AUDIO RECORDING AND DISPLAYING RELATED TEXT

(76) Inventor: Dianne Wagner Morton, 10228 Shireoaks La., Boca Raton, FL (US) 33498

( * ) Notice: Subject to any disclaimer, the term of this patent is extended or adjusted under 35 U.S.C. 154(b) by 0 days.

(21) Appl. No.: 09/527,985

(22) Filed: Mar. 17, 2000

Related U.S. Application Data

(60) Provisional application No. 60/124,894, filed on Mar. 17, 1999.

(51) Int. Cl.[7] .................................................. B65D 85/575
(52) U.S. Cl. ................................... 206/387.13; 206/387.1
(58) Field of Search .............................. 206/232, 387.1, 206/387.13; 283/117; 229/92.8

(56) References Cited

U.S. PATENT DOCUMENTS

| | | | |
|---|---|---|---|
| D. 334,210 | 3/1993 | Menchetti | D19/2 |
| 3,829,132 | 8/1974 | Willieme | 281/31 |
| 4,433,780 | 2/1984 | Ellis | 206/232 |
| 4,765,466 | 8/1988 | Ivey | 206/232 |
| 4,828,105 * | 5/1989 | Silengo et al. | 206/232 |
| 4,846,348 | 7/1989 | Smith | 206/387 |
| 4,981,211 | 1/1991 | Janek | 206/387 |
| 5,088,602 | 2/1992 | Heyderman et al. | 206/387 |
| 5,161,907 | 11/1992 | Byrne | 402/4 |
| 5,166,851 | 11/1992 | Jacobson | 360/137 |
| 5,288,144 | 2/1994 | Guderyon | 312/183 |
| 5,293,994 | 3/1994 | Antik | 206/387 |
| 5,407,076 | 4/1995 | Sabet | 206/581 |
| 5,662,222 | 9/1997 | Thayer et al. | 206/387 |
| 5,775,489 | 7/1998 | Vickers | 206/307.1 |
| 5,794,631 | 8/1998 | Sylvester | 206/387.1 |
| 5,915,734 * | 5/1989 | Minehart | 283/117 |

* cited by examiner

*Primary Examiner*—David T. Fidei
(74) *Attorney, Agent, or Firm*—Ronald V. Davidge

(57) ABSTRACT

A greeting card folded in the folio style of a conventional greeting card includes a holder for holding an audio cassette and a provision for displaying visual indicia describing audio information recorded on the cassette. This provision may be in the form of imprinted guidelines for writing, or it may be in the form of imprinted descriptive information. The greeting card may also include an adhesive surface for the attachment of a photograph or other visual indicia.

7 Claims, 2 Drawing Sheets

FOLDED GREETING CARD HOLDING AN AUDIO RECORDING AND DISPLAYING RELATED TEXT

This application claims benefit of a prior-filed provisional application, application Ser. No. 60/124,894, filed Mar. 17, 1999.

BACKGROUND OF THE INVENTION

1. Field of the Invention

This invention relates to the field of folded greeting cards having holders for holding audio cassettes.

2. Description of the Prior Art

U.S. Pat. No. 4,433,780 to Ellis describes a foldable member formed of cover stock and carrying thereon a receptacle having a configuration that is complementary to the configuration of a standard audio cassette. While this foldable member is particularly configured for convenient mailing, it does not have the folio configuration of conventional greeting cards, but rather the configuration of a box structure with internally imprinted sides. While an imprinted photograph and imprinted instructions for unfolding the folded member into various display configurations are shown, what is needed is a provision for adding visual information by the used, such as an attached, not imprinted, photograph, and written text, along with a more familiar folio-type of configuration.

U.S. Pat. No. 4,765,466 to Ivey describes a folio of card material for receiving an article. The folio comprises a sheet folded to form panels, one overlying another; a surface of one of said panels being provided with a pocket for receiving the article, the pocket being expansible from a flattened condition such that, on insertion of the article, the pocket expands in volume to receive the article. This folio is provided to replace a conventional token, which can be exchanged at an authorized dealer for merchandise having a value specified on the token, with the token having the general form of a greeting card. This folio instead includes a gift article itself, while retaining the general appearance of a greeting card. While this folio fills a particular need for gifts of specific small articles, it does not address a need for providing for sending information, including pictures, audio recordings, and written text provided by an individual sending the folio.

U.S. Pat. No. 4,846,348 to Smith describes a two-way mailing envelope for an audio cassette for conveying written and oral messages between a first sender and a first recipient. The two-way mailing envelope for an audio cassette includes an envelope, a first label and a second label which is enclosed in the envelope. The envelope is formed by joining a front panel with a flap which is disposed adjacent to an open end and a rear panel. A letter and an audio cassette may be placed in the envelope. A first layer of protecting material and a second layer of protecting material are mechanically coupled to the front and rear panels, respectively, in order to protect the audio cassette from damage. The first label is mechanically coupled to the front panel. The address of the first recipient and the return address of the first sender are applied on the first label. A first layer of adhesive material and a second layer of adhesive material are disposed on the flap in order to adhere the flap to the rear panel thereby closing the envelope. A first cover and a second cover the first and second layers of adhesive material, respectively, and are detachably coupled thereto. The first and second senders, respectively, use the first and second layers of adhesive material to secure the flap to the rear panel. While a convenient method for sending audio cassettes back and forth is provided, the only provisions made for written material relate to addressing the envelope to be mailed in each direction. Again, what is needed is a method providing for appending photographs and written material from the sender.

A different approach to sending recorded audio information is described in U.S. Pat. No. 5,166,851 to Jacobson. An "audio mailer," including a tape recorder or other sound recording and reproducing device non-removably encased and configured as a mailer, so that a user can conveniently and confidentially send or receive voice or other sound messages through the mail. The mailer may further have a crevice space for an inserted enclosure, such as a letter, document, photograph or other indicia. A customized or commercially available small tape recorder and audiotape sound storage medium may be employed in the preferred embodiment. The audiotape may be either built-in or contained in a removable microcassette. While storage of a letter, document, or photograph, etc. is provided in a crevice space, what is needed is a way to display such visual information, particularly in a folio configuration. Furthermore, the need to send an entire tape recorder makes the package to be sent much larger and more expensive than the packages of other methods.

A number of other patents describe book-like containers for audio cassettes and for similar articles, such as video cassettes. These containers are typically described as being used to provide archival storage for the cassettes in an attractive, protective, and easily accessed containers. For example, U.S. Pat. No. 3,829,132 to Willieme describes a composite cover-support for tape cassettes and books, which comprises a cover assembly, similar to the covers of a book, and, joined to this assembly, at least one receptacle for at least one tape cassette and at least one means of fixation for at least one book, these elements being arranged in such a manner that, when said cover assembly is folded up upon itself, the cassette and the book lie adjacent each other, occupy substantially the total space between the cover members and are coplanar, with the cassette being held in position within the cover assembly by an edge of the book or by an edge of the support means for the book within the cover assembly. Other examples of such book-like containers are described in U.S. Pat. No. 5,088,602 to Heyderman et al., U.S. Pat. No. 5,161,907 to Byrne, and U.S. Pat. No. 5,755,489 to Vickers. Such patents do not address a need for presenting cassettes, pictures, and text in an easily-mailed greeting card format.

SUMMARY OF THE INVENTION

It is a first objective of the present invention to provide a folded greeting card having the general appearance of a folio-type greeting card, with a capability to hold a conventional audio cassette.

It is a second objective of the present invention to provide a folded greeting card having a capability to present textual information describing the content of an audio recording in a cassette held within the folded greeting card. In a mass-produced version of the folded greeting card, this information may be imprinted within the greeting card, while in an individually produced version of the folded greeting card, guidelines may be provided to facilitate handwriting such information.

According to a first aspect of the present invention, there is provided a greeting card including a central folding portion, first and second inner surfaces, first and second external surfaces, a holder for holding an audio cassette, and a pattern of imprinted guidelines. The first inner surface extends in a first direction from the central folding portion, while the second inner surface extends opposite the first direction from the central folding portion. When the greeting card is folded into a closed configuration, the first and second inner surfaces face one another. The first and second external surfaces extending along portions of the greeting card opposite the first and second inner surfaces, respectively. The holder is attached to the first inner surface, and the pattern of guidelines is imprinted on the second inner surface, being spaced to facilitate writing a description of audio information recorded in the audio cassette.

DETAILED DESCRIPTION

Figure 1:
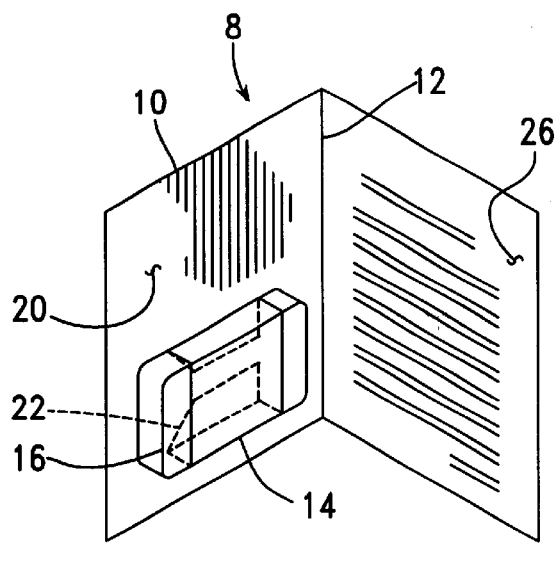
FIG. 1 is an isometric view of a folded greeting card made in accordance with the present invention with the greeting card partly open, as viewed from an interior side to show interior surfaces of the greeting card;.

FIG. 1 is an isometric view of a folded greeting card 8 made in accordance with the present invention, as viewed from an interior side to show interior surfaces of the greeting card. The folded greeting card 8 includes a cardstock body 10 bisected by a fold line 12, allowing the greeting card to be opened and closed in the manner of a conventional greeting card. The greeting card 8 further includes a sleeve 14 for holding an audio cassette 16. The sleeve 14 is preferably also made of cardstock, including a pair of tabs 18 folded inward and adhesively attached to a first inner surface 20 of the cardstock body 10. To facilitate insertion of the cassette 16 without catching an edge of the cassette 16 on an edge of the sleeve 14, each tab 18 preferably includes an acutely angled edge 22 facing the direction from which the audio cassette 16 is inserted. A series of guidelines 23 is preferably printed on a second inner surface 24, which extends from the fold line 12 opposite the first inner surface 10, with these guidelines 23 being configured for use to facilitate the writing of information on the second inner surface 24.

It is anticipated that the folded greeting card 8 will typically be used to send audio material recorded or otherwise obtained by a person preparing the greeting card for mailing, and that the guidelines can be used to provide written information describing the contents of the audio information recorded in the cassette 16. This function of the guidelines 23 is particularly important, since the audio information is by nature hidden until the cassette 16 is removed from the folded greeting card 8 and placed in an audio cassette player. Thus, the information written within the guidelines 23 can encourage the person receiving the greeting card to proceed to play the cassette 16. Alternately, the folded greeting card 8 may be used to distribute a large number of identical cassettes 16 to different people receiving mailings, with text describing the audio material being imprinted in the location indicated by guidelines 23. Text and/or graphical material may also be imprinted on the portion of the first inner surface 20 not covered by the cassette 16.

Figure 2:
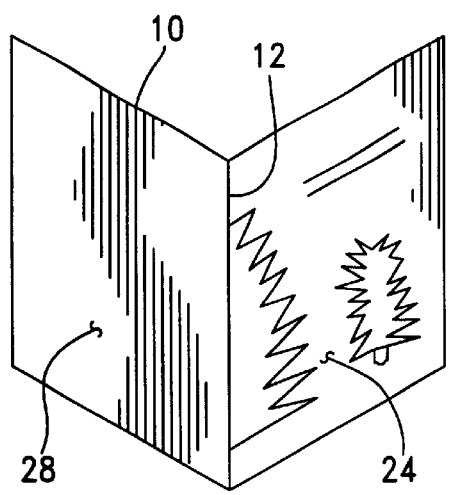
FIG. 2 is an isometric view of the greeting card of FIG. 1 with the greeting card partly open, as viewed from an external side to show external front and rear surfaces of the greeting card.

FIG. 2 is an isometric view of the folded greeting card 8, as viewed from an exterior side to show exterior surfaces of the greeting card. Graphical material, such as a picture, is preferably printed on the front external surface 26, in the manner conventionally associated with a greeting card. Text and/or graphical material can also be printed on the rear external surface 28.

Figure 3:
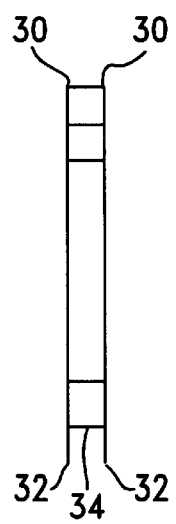
FIG. 3 is a top plan view of folded greeting card made in accordance with a first alternative version of the greeting card of the present invention.

FIG. 3 is a top plan view of folded greeting card made in accordance with a first alternative version of the greeting card of the present invention. In the example of FIG. 3, the single fold line 12, described above in reference to FIG. 1, is replaced by a pair of fold lines 30, which are spaced apart by a distance allowing the sides 32 of the cardstock body to lie flat when closed over the cassette 34.

Figure 4:
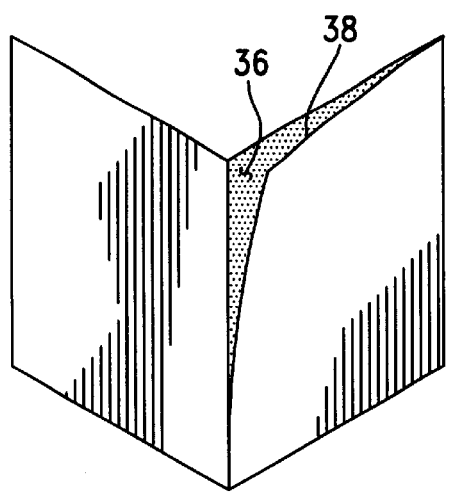
FIG. 4 is an isometric view of a folded greeting card made in accordance with a second alternative version of the greeting card of the present invention with the greeting card partly open, as viewed from an external side to show external front and rear surfaces of the greeting card.

FIG. 4 is an isometric view of a folded greeting card made in accordance with a second alternative version of the greeting card of the present invention with the greeting card partly open, as viewed from an external side to show external front and rear surfaces of the greeting card. This version of the greeting card includes a front surface 36, of which at least a portion is covered with an adhesive coating instead of printed graphics. The adhesive coating is preferably covered with a protective liner 38 which can be peeled away to expose the coating. This configuration allows the placement of a photograph or other visual element on the greeting card, to be held in place by the adhesive. This adhesive configuration may be alternately or additionally applied to other surfaces of the greeting card.

Figure 5:
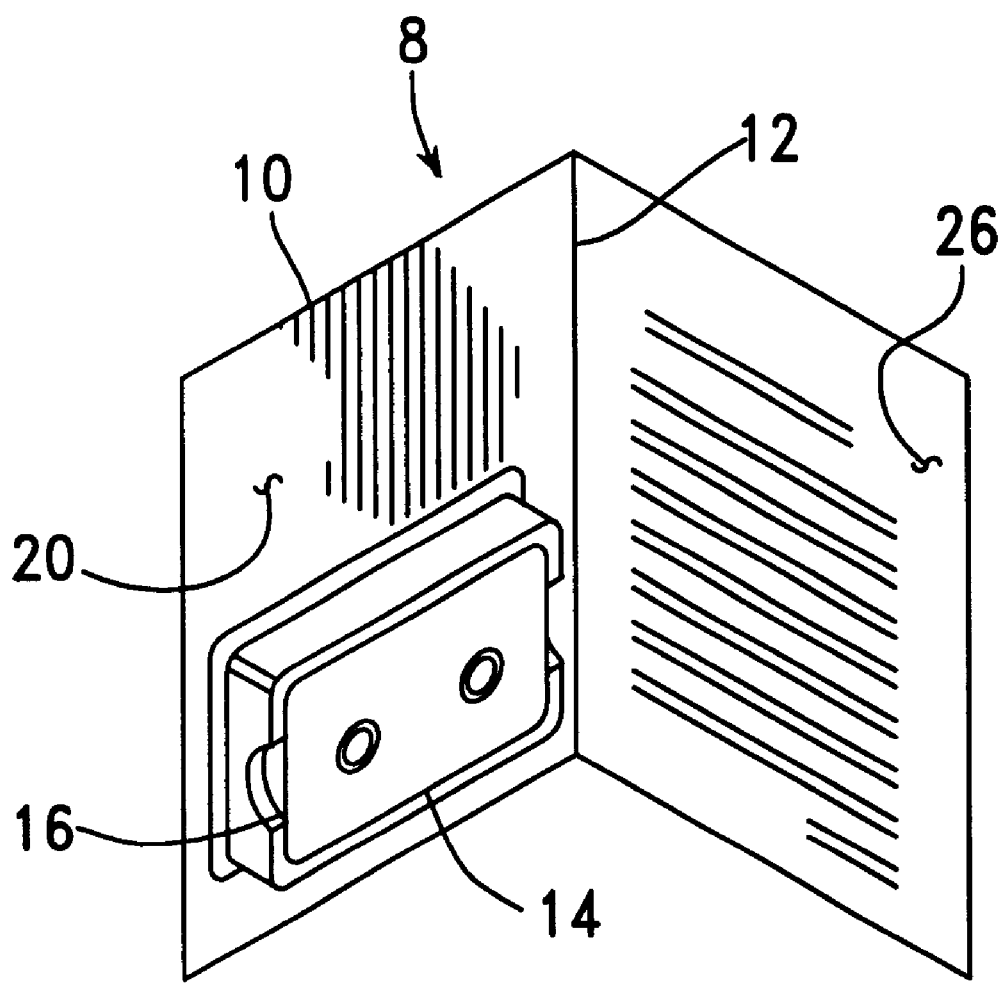
FIG. 5 is an isometric view of a folded greeting card made in accordance with a third alternative version of the present invention with the greeting card partly open, as viewed from an interior side to show interior surfaces of the greeting card.

FIG. 5 is an isometric view of a folded greeting card made in accordance with a third alternative version of the present invention with the greeting card partly open, as viewed from an interior side to show interior surfaces of the greeting card. In this version of the folded greeting card, the audio cassette 16 is snapped into a pocket 40 having a front face opening 42, extending into a cavity 44 having surfaces fitting against the audio cassette 16, instead of being held within a sleeve in the manner described above in reference to FIG. 1.

While the present invention has been described in preferred versions with some degree of particularity, it is understood that this description has been given only by way of example, and that numerous changes in the details of construction, fabrication, and use may be made without departing from the spirit and scope of the invention.

What is claimed is:

1. A greeting card comprising:
   a central folding portion;
   a first inner surface extending in a first direction from said central folding portion;
   a second inner surface extending opposite said first direction from said central folding portion, wherein said first and second inner surfaces face one another when said greeting card is folded into a closed configuration;
   a first external surface extending along a portion of said greeting card opposite said first inner surface;
   a second external surface extending along a portion of said greeting card opposite said second inner surface;

a holder for holding an audio cassette, wherein said holder is attached to said first inner surface;

a pattern of guidelines imprinted on said second inner surface, spaced to facilitate writing a description of audio information recorded in said audio cassette; and an adhesive layer extending along a surface of said greeting card, wherein said adhesive layer is covered with a removable protective layer.

2. The greeting card of claim 1, wherein said adhesive layer extends along said first external surface.

3. Apparatus comprising:

a greeting card having a central folding portion, a first inner surface extending in a first direction from said central folding portion, a second inner surface extending opposite said first direction from said central folding portion, wherein said first and second inner surfaces face one another when said greeting card is folded into a closed configuration, a first external surface extending along a portion of said greeting card opposite said first inner surface, a second external surface extending along a portion of said greeting card opposite said second inner surface, a holder for holding an audio cassette, wherein said holder is attached to said first inner surface, and an adhesive layer extending along a surface of said greeting card, wherein said adhesive layer is covered with a removable protective layer; and an audio cassette within said holder including recorded audio information, wherein said second inner surface includes visual indicia describing said recorded audio information.

4. The apparatus of claim 3, wherein said adhesive layer extends along said first external surface.

5. A greeting card comprising:

a central folding portion;

a first inner surface extending in a first direction from said central folding portion;

a second inner surface extending opposite said first direction from said central folding portion, wherein said first and second inner surfaces face one another when said greeting card is folded into a closed configuration;

a first external surface extending along a portion of said greeting card opposite said first inner surface;

a second external surface extending along a portion of said greeting card opposite said second inner surface;

a holder for holding an audio cassette, wherein said holder is attached to said first inner surface; and an adhesive layer extending along a surface of said greeting card, wherein said adhesive layer is covered with a removable protective layer.

6. The greeting card of claim 5, wherein said adhesive layer extends along said first external surface.

7. The greeting card of claim 1, wherein said central folding portion includes a pair of fold lines, spaced apart so that said first and second inner surfaces extend in a parallel relationship when said greeting card is folded into said closed configuration.

\* \* \* \* \*